United States Patent
Park et al.

(10) Patent No.: US 12,074,701 B2
(45) Date of Patent: Aug. 27, 2024

(54) LEGACY CONTROL CHANNEL FORMAT SUPPORT

(71) Applicant: QUALCOMM Incorporated, San Diego, CA (US)

(72) Inventors: Cheol Hee Park, San Diego, CA (US); Moshe Ben-Ari, Rehovot (IL); Lior Uziel, Hod Hasharon (IL); Guy Spiegelstein, Nes-Ziona (IL)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 17/302,811

(22) Filed: May 12, 2021

(65) Prior Publication Data

US 2021/0359782 A1 Nov. 18, 2021

Related U.S. Application Data

(60) Provisional application No. 63/024,876, filed on May 14, 2020.

(51) Int. Cl.
*H04W 72/02* (2009.01)
*H04B 17/318* (2015.01)
(Continued)

(52) U.S. Cl.
CPC ........... *H04L 1/003* (2013.01); *H04B 17/318* (2015.01); *H04L 1/0005* (2013.01);
(Continued)

(58) Field of Classification Search
None
See application file for complete search history.

(56) References Cited

U.S. PATENT DOCUMENTS

| | | |
|---|---|---|
| 2007/0183524 A1 | 8/2007 | Moon et al. |
| 2011/0275379 A1 | 11/2011 | Hakola et al. |

(Continued)

FOREIGN PATENT DOCUMENTS

| | | |
|---|---|---|
| CN | 101919194 A | 12/2010 |
| CN | 110612692 A | 12/2019 |

(Continued)

OTHER PUBLICATIONS

International Search Report and Written Opinion—PCT/US2021/032198—ISA/EPO—Sep. 21, 2021.

*Primary Examiner* — Jenkey Van
(74) *Attorney, Agent, or Firm* — Arun Swain

(57) ABSTRACT

Various aspects of the present disclosure generally relate to wireless communication. In some aspects, a user equipment (UE) may receive a control channel message encoded according to a first format that is associated with a different set of shared data channel parameters than a second format supported by the UE. The second format is a legacy format relative to the first format. The UE may further determine that the control channel message is encoded according to the first format based at least in part on comparing one or more bit values, of the control channel message, in bit positions corresponding to a set of bits defined by the second format, and one or more expected bit values defined by the first format. The UE may select one or more resources for transmission based at least in part on information included in the control channel message. Numerous other aspects are provided.

30 Claims, 11 Drawing Sheets

(51) Int. Cl.
*H04L 1/00* (2006.01)
*H04W 72/0446* (2023.01)
*H04W 72/0453* (2023.01)
*H04W 72/1263* (2023.01)
*H04W 72/54* (2023.01)

(52) U.S. Cl.
CPC ........... *H04L 1/0007* (2013.01); *H04W 72/02* (2013.01); *H04W 72/0446* (2013.01); *H04W 72/0453* (2013.01); *H04W 72/1263* (2013.01); *H04W 72/54* (2023.01)

(56) References Cited

U.S. PATENT DOCUMENTS

| | | | |
|---|---|---|---|
| 2013/0114450 A1 | 5/2013 | Xu et al. | |
| 2014/0003353 A1 | 1/2014 | Stephens et al. | |
| 2014/0192757 A1 | 7/2014 | Lee et al. | |
| 2018/0332620 A1* | 11/2018 | Malladi | H04W 4/70 |
| 2018/0376304 A1* | 12/2018 | Cheng | H04L 69/18 |
| 2019/0110178 A1* | 4/2019 | Baghel | H04W 4/40 |
| 2019/0306923 A1* | 10/2019 | Xiong | H04J 13/0062 |
| 2019/0387377 A1* | 12/2019 | Zhang | H04W 52/383 |
| 2019/0394786 A1* | 12/2019 | Parron | H04W 4/46 |
| 2020/0029245 A1* | 1/2020 | Khoryaev | H04W 36/22 |
| 2020/0053675 A1* | 2/2020 | Khoryaev | H04W 56/002 |
| 2021/0053675 A1* | 2/2021 | Agronov | B64C 39/024 |
| 2021/0144750 A1* | 5/2021 | Cao | H04W 72/0453 |
| 2021/0204250 A1* | 7/2021 | Ashraf | H04W 72/56 |
| 2022/0330275 A1* | 10/2022 | Dong | H04L 1/18 |

FOREIGN PATENT DOCUMENTS

| | | |
|---|---|---|
| EP | 0946072 A1 | 9/1999 |
| EP | 3030024 A1 | 6/2016 |
| EP | 3603247 A1 | 2/2020 |
| WO | WO-2010085912 A1 | 8/2010 |
| WO | 2018175553 A1 | 9/2018 |
| WO | 2020037110 | 2/2020 |

* cited by examiner

LEGACY CONTROL CHANNEL FORMAT SUPPORT

CROSS-REFERENCE TO RELATED APPLICATION

This Patent Application claims priority to U.S. Provisional Patent Application No. 63/024,876, filed on May 14, 2020, entitled "LEGACY CONTROL CHANNEL FORMAT SUPPORT," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for supporting legacy control channel formats.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or forward link) refers to the communication link from the BS to the UE, and "uplink" (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), includes receiving a control channel message encoded according to a first format that is associated with a different set of shared data channel (SCH) parameters than a second format supported by the UE, wherein the second format is a legacy format relative to the first format; determining that the control channel message is encoded according to the first format based at least in part on comparing one or more bit values, of the control channel message, in bit positions corresponding to a set of bits defined by the second format, and one or more expected bit values defined by the first format; and selecting one or more resources for transmission, based at least in part on information included in the control channel message, when the control channel message is encoded according to the first format.

In some aspects, a method of wireless communication, performed by a UE, includes monitoring a set of resources based at least in part on a resource pool configuration, wherein the resource pool configuration indicates one of: a common resource pool for a first set of UEs that support a set of SCH parameters and a second set of UEs that support a proper subset of the set of SCH parameters, or a first resource pool for the first set of UEs and a second resource pool for the second set of UEs, wherein the first resource pool is separate from the second resource pool; and selecting one or more resources, from the common resource pool or the first resource pool and the second resource pool, for transmission based at least in part on monitoring the set of resources.

In some aspects, a UE for wireless communication includes a memory and one or more processors coupled to the memory. The memory and the one or more processors are configured to receive a control channel message encoded according to a first format that is associated with a different set of SCH parameters than a second format supported by the UE, wherein the second format is a legacy format relative to the first format; determine that the control channel message is encoded according to the first format based at least in part on comparing one or more bit values, of the control channel message, in bit positions corresponding to a set of bits defined by the second format, and one or more expected bit values defined by the first format; and select one or more resources for transmission, based at least in part on information included in the control channel message, when the control channel message is encoded according to the first format.

In some aspects, a UE for wireless communication includes a memory and one or more processors coupled to the memory. The memory and the one or more processors are configured to monitor a set of resources based at least in part on a resource pool configuration, wherein the resource pool configuration indicates one of: a common resource pool for a first set of UEs that support a set of SCH parameters and a second set of UEs that support a proper subset of the set of SCH parameters, or a first resource pool for the first set of UEs and a second resource pool for the second set of UEs, wherein the first resource pool is separate from the second resource pool; and select one or more resources, from the common resource pool or the first resource pool and the second resource pool, for transmission based at least in part on monitoring the set of resources.

In some aspects, a non-transitory computer-readable medium stores one or more instructions for wireless communication. The one or more instructions, when executed by one or more processors of a UE, cause the UE to receive a control channel message encoded according to a first format that is associated with a different set of SCH parameters than a second format supported by the UE, wherein the second format is a legacy format relative to the first format; determine that the control channel message is encoded according to the first format based at least in part on comparing one or more bit values, of the control channel message, in bit positions corresponding to a set of bits defined by the second format, and one or more expected bit values defined by the first format; and select one or more resources for transmission, based at least in part on information included in the control channel message, when the control channel message is encoded according to the first format.

In some aspects, a non-transitory computer-readable medium stores one or more instructions for wireless communication. The one or more instructions, when executed by one or more processors of a UE, cause the UE to monitor a set of resources based at least in part on a resource pool configuration, wherein the resource pool configuration indicates one of: a common resource pool for a first set of UEs that support a set of SCH parameters and a second set of UEs that support a proper subset of the set of SCH parameters, or a first resource pool for the first set of UEs and a second resource pool for the second set of UEs, wherein the first resource pool is separate from the second resource pool; and select one or more resources, from the common resource pool or the first resource pool and the second resource pool, for transmission based at least in part on monitoring the set of resources.

In some aspects, an apparatus for wireless communication includes means for receiving a control channel message encoded according to a first format that is associated with a different set of SCH parameters than a second format supported by the apparatus, wherein the second format is a legacy format relative to the first format; means for determining that the control channel message is encoded according to the first format based at least in part on comparing one or more bit values, of the control channel message, in bit positions corresponding to a set of bits defined by the second format, and one or more expected bit values defined by the first format; and means for selecting one or more resources for transmission, based at least in part on information included in the control channel message, when the control channel message is encoded according to the first format.

In some aspects, an apparatus for wireless communication includes means for monitoring a set of resources based at least in part on a resource pool configuration, wherein the resource pool configuration indicates one of: a common resource pool for a first set of UEs that support a set of SCH parameters and a second set of UEs that support a proper subset of the set of SCH parameters, or a first resource pool for the first set of UEs and a second resource pool for the second set of UEs, wherein the first resource pool is separate from the second resource pool; and means for selecting one or more resources, from the common resource pool or the first resource pool and the second resource pool, for transmission based at least in part on monitoring the set of resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
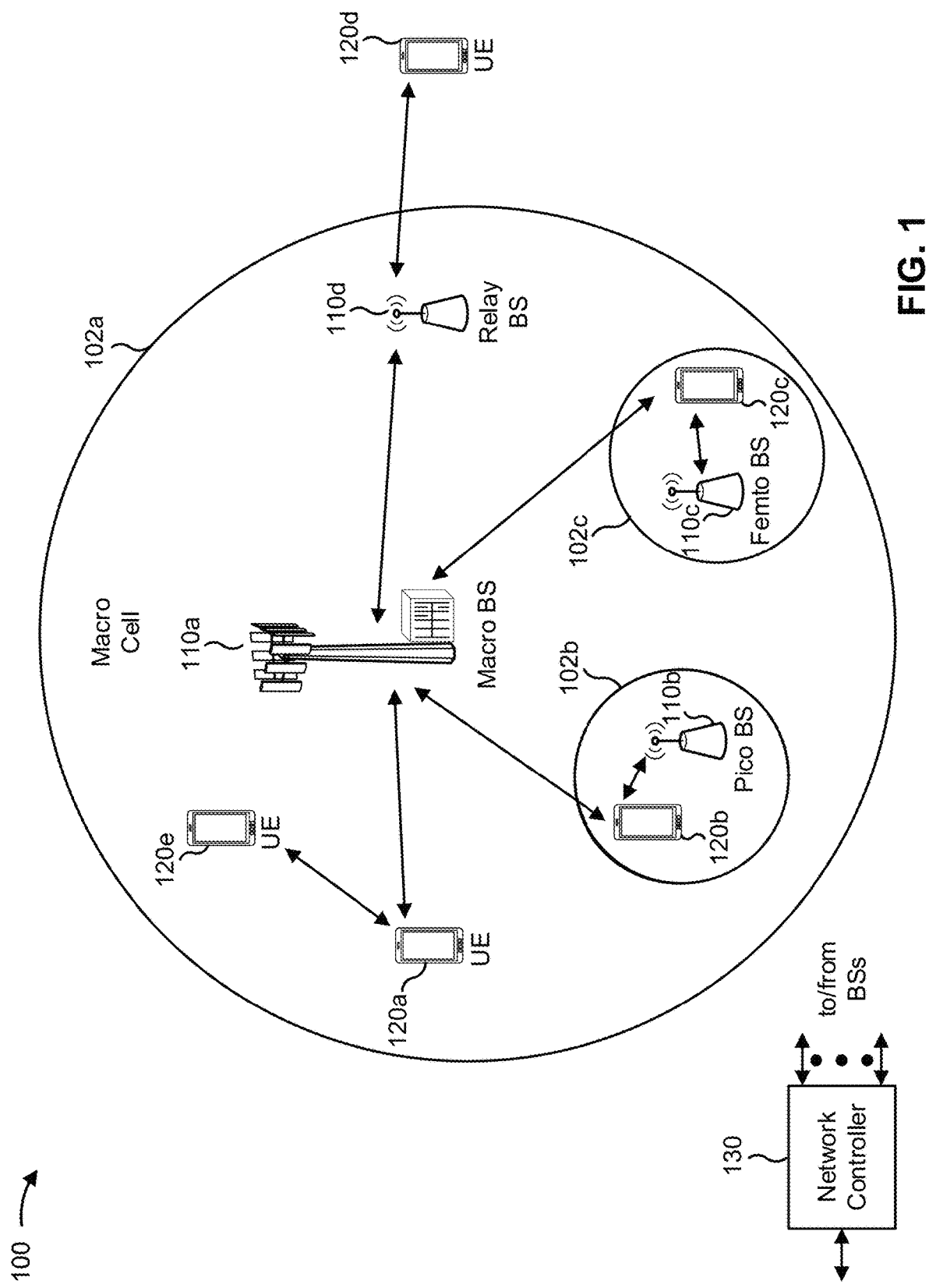
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
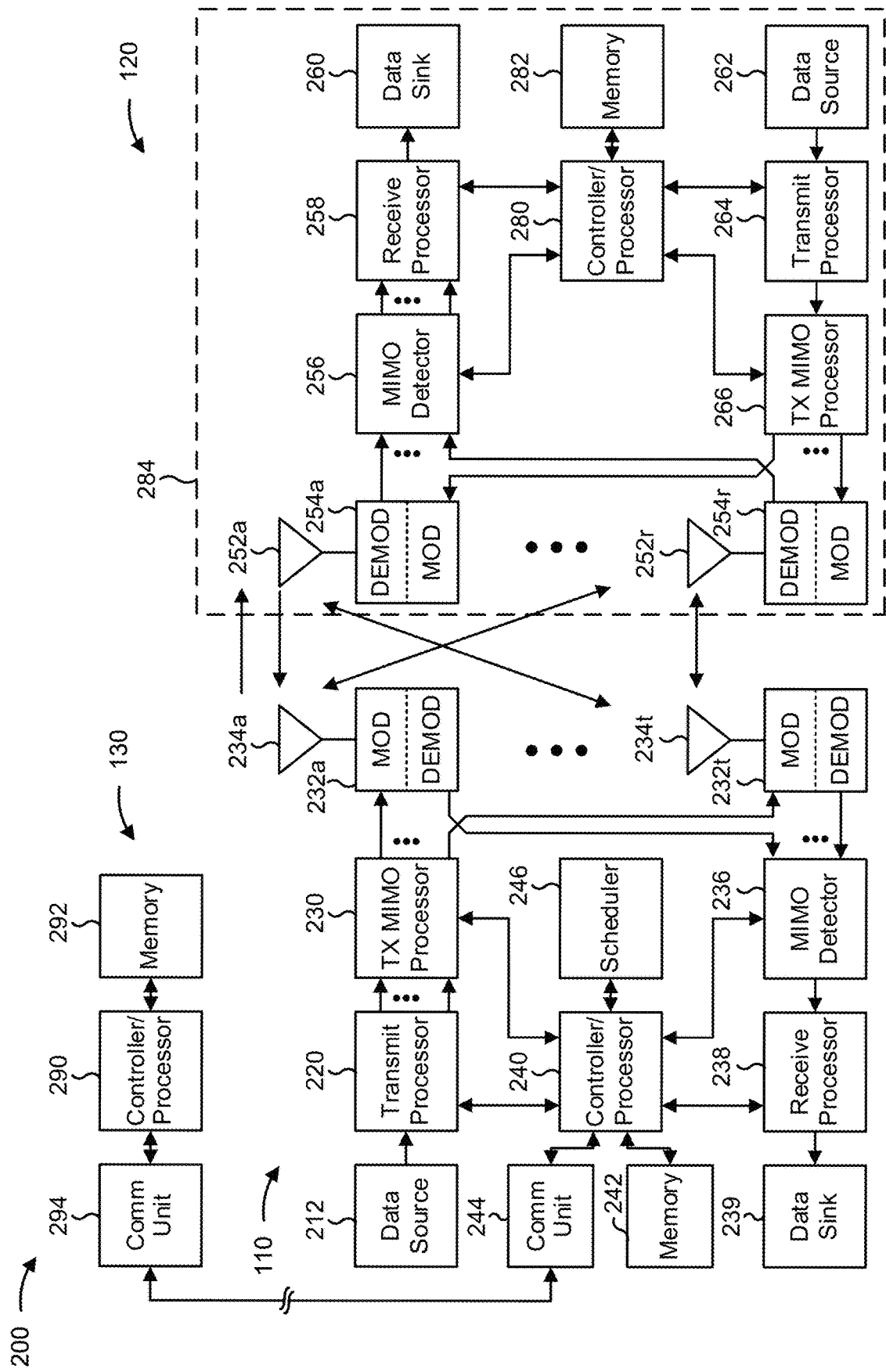
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, with reference to FIGS. 6-11).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, with reference to FIGS. 6-11).

Controller/processor 240 of base station 110, controller/processor 280 of UE 120, and/or any other component(s) of FIG. 2 may perform one or more techniques associated with supporting legacy control channel formats, as described in more detail elsewhere herein. For example, controller/processor 240 of base station 110, controller/processor 280 of UE 120, and/or any other component(s) of FIG. 2 may perform or direct operations of, for example, process 1000 of FIG. 10, process 1100 of FIG. 11, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some aspects, executing instructions may include running the instructions, converting the instructions, compiling the instructions, and/or interpreting the instructions, among other examples.

In some aspects, a UE (e.g., the UE 120) may include means for receiving a control channel message encoded according to a first format that is associated with a different set of shared data channel (SCH) parameters than a second format supported by the UE, wherein the second format is a legacy format relative to the first format; means for determining that the control channel message is encoded according to the first format based at least in part on comparing one or more bit values, of the control channel message, in bit positions corresponding to a set of bits defined by the second format, and one or more expected bit values defined by the first format; and/or means for selecting one or more resources for transmission, based at least in part on information included in the control channel message, when the control channel message is encoded according to the first format. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

Additionally, or alternatively, the UE 120 may include means for monitoring, by the UE, a set of resources based at least in part on a resource pool configuration, wherein the resource pool configuration indicates one of: a common resource pool for a first set of UEs that support a set of SCH parameters and a second set of UEs that support a proper subset of the set of SCH parameters, or a first resource pool for the first set of UEs and a second resource pool for the second set of UEs, wherein the first resource pool is separate from the second resource pool; and/or means for selecting one or more resources, from the common resource pool or the first resource pool and the second resource pool, for transmission based at least in part on monitoring the set of resources. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
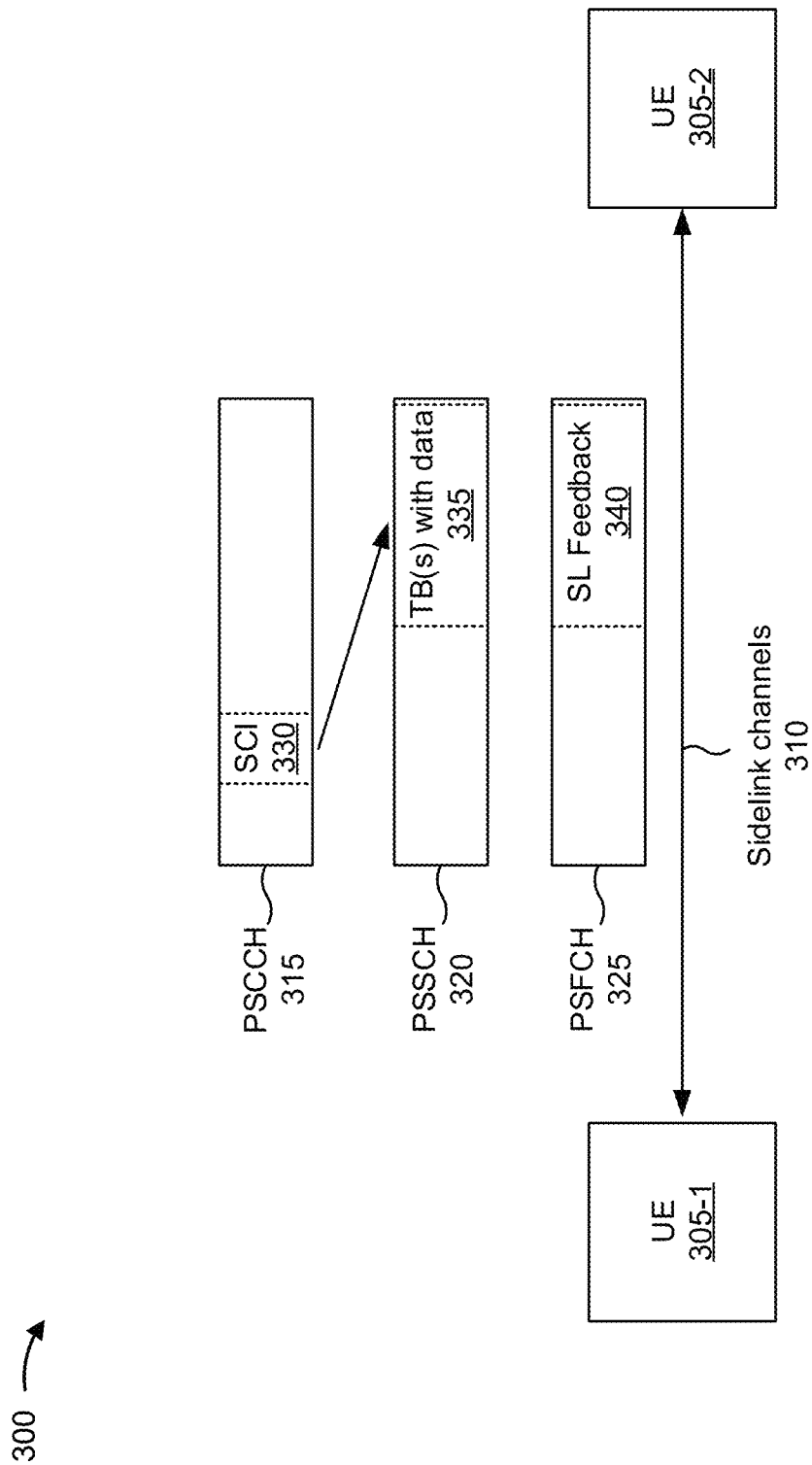
FIG. 3 is a diagram illustrating an example of sidelink communications, in accordance with the present disclosure.

FIG. 3 is a diagram illustrating an example 300 of sidelink communications, in accordance with the present disclosure. As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle-to-pedestrian (V2P) communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARD) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or an MCS. The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
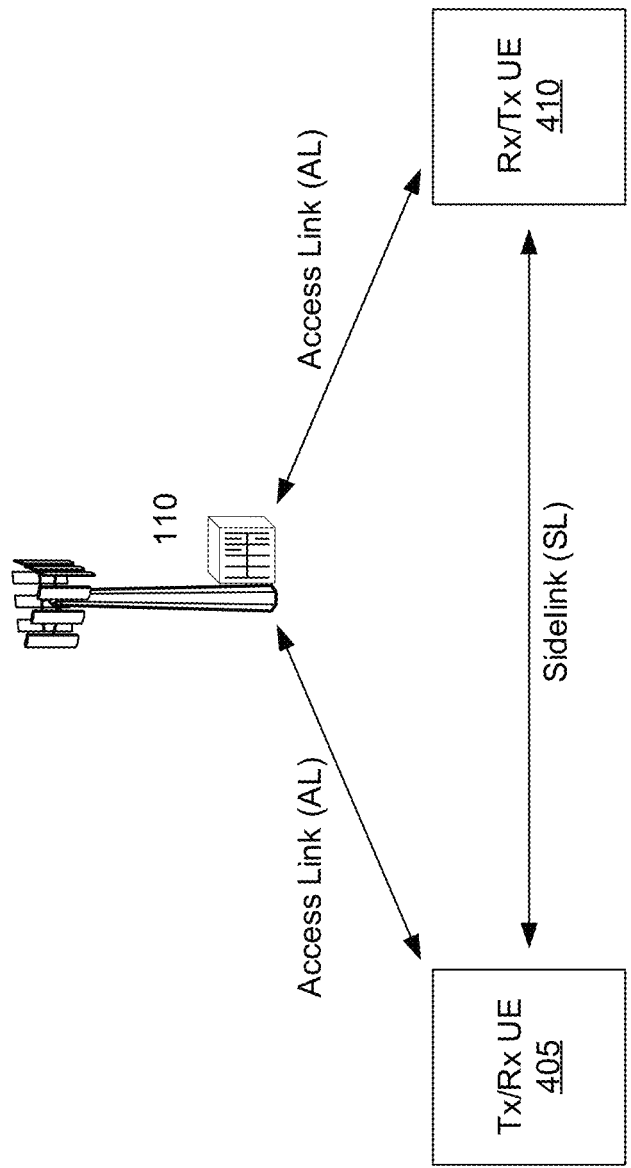
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure. As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
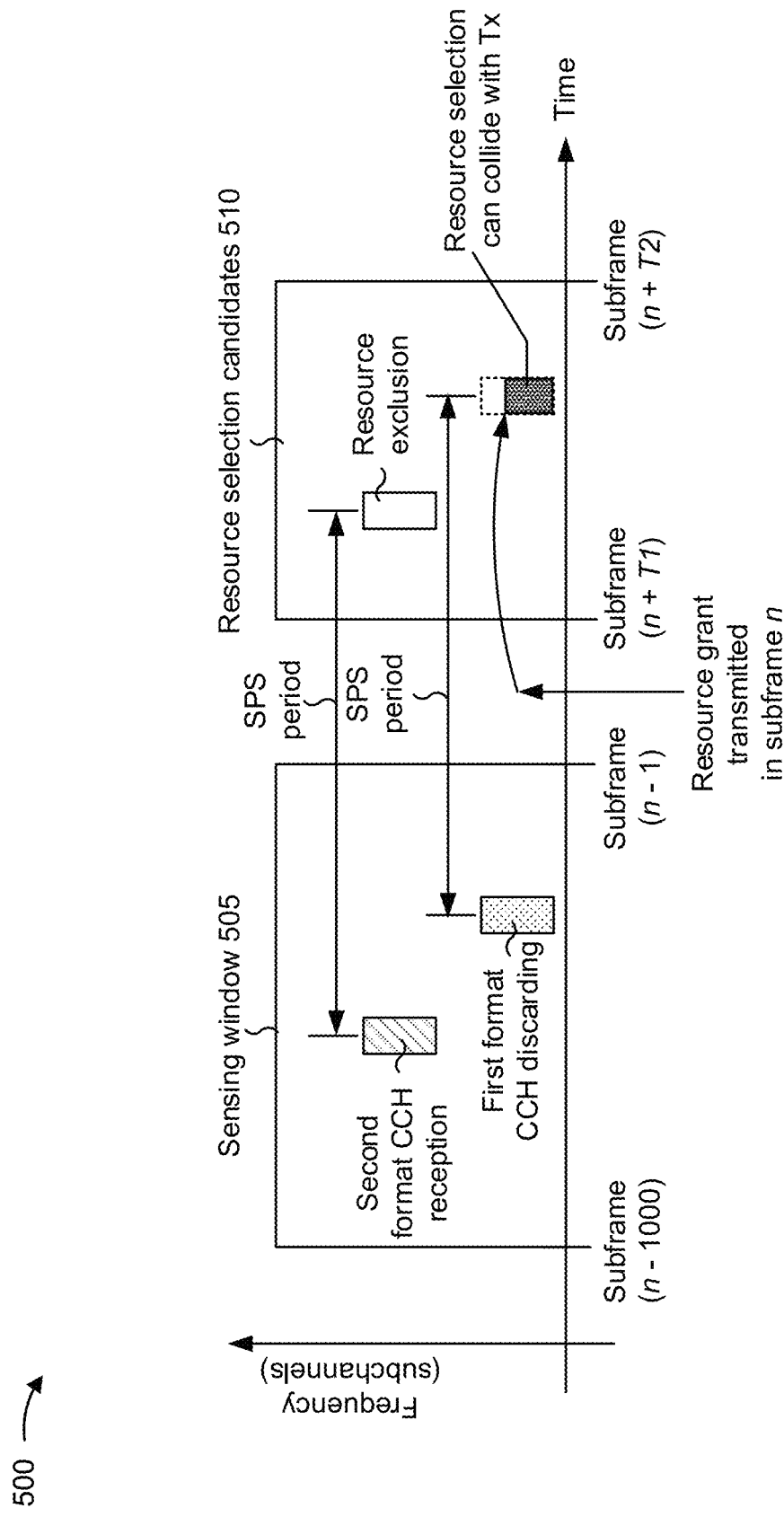
FIG. 5 is a diagram illustrating an example of resource collision for messages with different control channel formats, in accordance with the present disclosure.

FIG. 5 is a diagram illustrating an example 500 of resource collision for messages with different control channel formats, in accordance with the present disclosure. As shown in FIG. 5, a UE may monitor for messages within a sensing window 505. The sensing window 505 may span a portion of a time domain (e.g., represented as subframe (n−1000) to subframe (n−1) in example 500, where n may represent a current subframe) and a portion of a frequency domain (also referred to as a subchannel domain). In some aspects, the UE may use RSSI sensing within the sensing window 505.

As further shown in FIG. 5, the UE may select resources for transmission from resource selection candidates 510. For example, the UE may select resources in response to detecting a message within the sensing window 505. Accordingly, the UE may grant the selected resources to another device (such as another UE) to use for transmission (e.g., over a sidelink channel, as described above in connection with FIGS. 3-4). For example, the UE may transmit a grant at a subframe represented by n to the other device for the resources selected within the resource selection candidates 510. Similar to the sensing window 505, the resource selection candidates 510 may span a portion of the time domain (e.g., represented as subframe (n+T1) to subframe (n+T2) in example 500, where T1 may represent an offset associated with a resource request from the other device, and T2 may represent a length associated with the resource selection candidates 510 with respect to T1) and a portion of the frequency domain.

In some aspects, the UE may determine the resource selection candidates 510 based at least in part on applying resource exclusion that is based at least in part on control channel (CCH) information included in a message, which is detected within the sensing window 505. For example, as shown in FIG. 5, the UE may use an SPS period, a priority value, a resource reservation protocol (RSVP) value, and/or another parameter indicated by the CCH information to exclude one or more resources from the resource selection candidates 510. The UE may therefore prevent resource collision with further transmissions on the CCH and/or an SCH associated with the CCH information.

As further shown in FIG. 5, the UE may support a second format for encoding CCH information. For example, the second format may be a legacy format relative to a first format. In some aspects, the first format may be defined within a first standard, and the second format may be defined within a second standard. Accordingly, in some aspects, the second standard may be a legacy standard relative to the first standard. For example, the first standard and the second standard may be defined by 3GPP specifications and/or other standards documents. For example, the first standard may be defined in a first release of 3GPP specifications (such as Release 15), and the second standard may be defined in a second release of 3GPP specifications (such as Release 14) that is a legacy release relative to the first release.

In some aspects, the first standard may support at least one modulation technique that is not supported by the second standard. For example, the first standard may support 64 quadrature amplitude modulation (QAM) and/or another modulation technique, while the second standard does not. In some aspects, the first standard and the second standard may additionally support at least one modulation technique in common, such as quadrature phase-shift keying (QPSK) modulation, 16 QAM, and/or another modulation technique.

As shown in FIG. 5, the UE may support the second standard but not support the first standard. Accordingly, the UE may discard CCH information included in a message, which is detected within the sensing window 505, when the message is encoded according to the first format. Additionally, or alternatively, the first format may be associated with a different set of SCH parameters than the second format. For example, the different set of SCH parameters may include a different MCS table, a different TB size (TBS) mapping rule, and/or another different parameter. In some aspects, the different set of SCH parameters may be such that a first set of UEs supports a set of SCH parameters and a second set of UEs supports a proper subset of the set of SCH parameters. Accordingly, the UE in example 500 may belong to the second set of UEs such that the UE discards CCH information included in a message, which is detected within the sensing window 505, when the message is encoded according to the first format.

However, by discarding the CCH information, the UE may select one or more resources in the resource selection candidates 510 that collide with further transmissions on the CCH and/or an SCH associated with the CCH information. In example 500, the UE transmits a grant, to the other device, of resources that collide with transmissions on the CCH and/or the associated SCH.

Accordingly, example 500 illustrates that a UE may cause resource collision when granting resources for transmission in response to CCH information encoded according to a newer format not supported by the UE. The resource collision depicted in FIG. 5 may occur during any UE communications, including those with a base station (e.g., as described above in connection with FIGS. 1-2) and/or with other UEs (e.g., sidelink communications as described above in connection with FIGS. 3-4). For example, the collisions illustrated in FIG. 5 may occur during V2X communications in a cellular environment (also referred to as C-V2X communications).

As indicated above, FIG. 5 is provided as an example. Other examples may differ from what is described with respect to FIG. 5.

Some techniques and apparatuses of the present disclosure enable a UE (e.g., UE 120 and/or UE 305) to avoid resource collision caused by CCH information encoded according to a newer format not supported by the UE 120 (e.g., as depicted in FIG. 5). For example, techniques and apparatuses described herein enable the UE 120 to decode CCH information encoded according to a newer format not supported by the UE 120 and apply resource exclusion based at least in part on the decoded CCH information. The UE 120 therefore avoids resource collision, which improves quality and/or reliability of communications with the UE 120. The UE 120 also conserves processing resources, network resources, and power by reducing chances of retransmissions necessitated by low quality and/or reliability of initial transmissions. Additionally, or alternatively, techniques and apparatuses described herein enable the UE 120 to use resource pools for newer and legacy formats that avoid resource collision, which improves quality and/or reliability of communications with the UE 120. The UE 120 also conserves processing resources, network resources, and power by reducing chances of retransmissions necessitated by low quality and/or reliability of initial transmissions.

Figure 6:
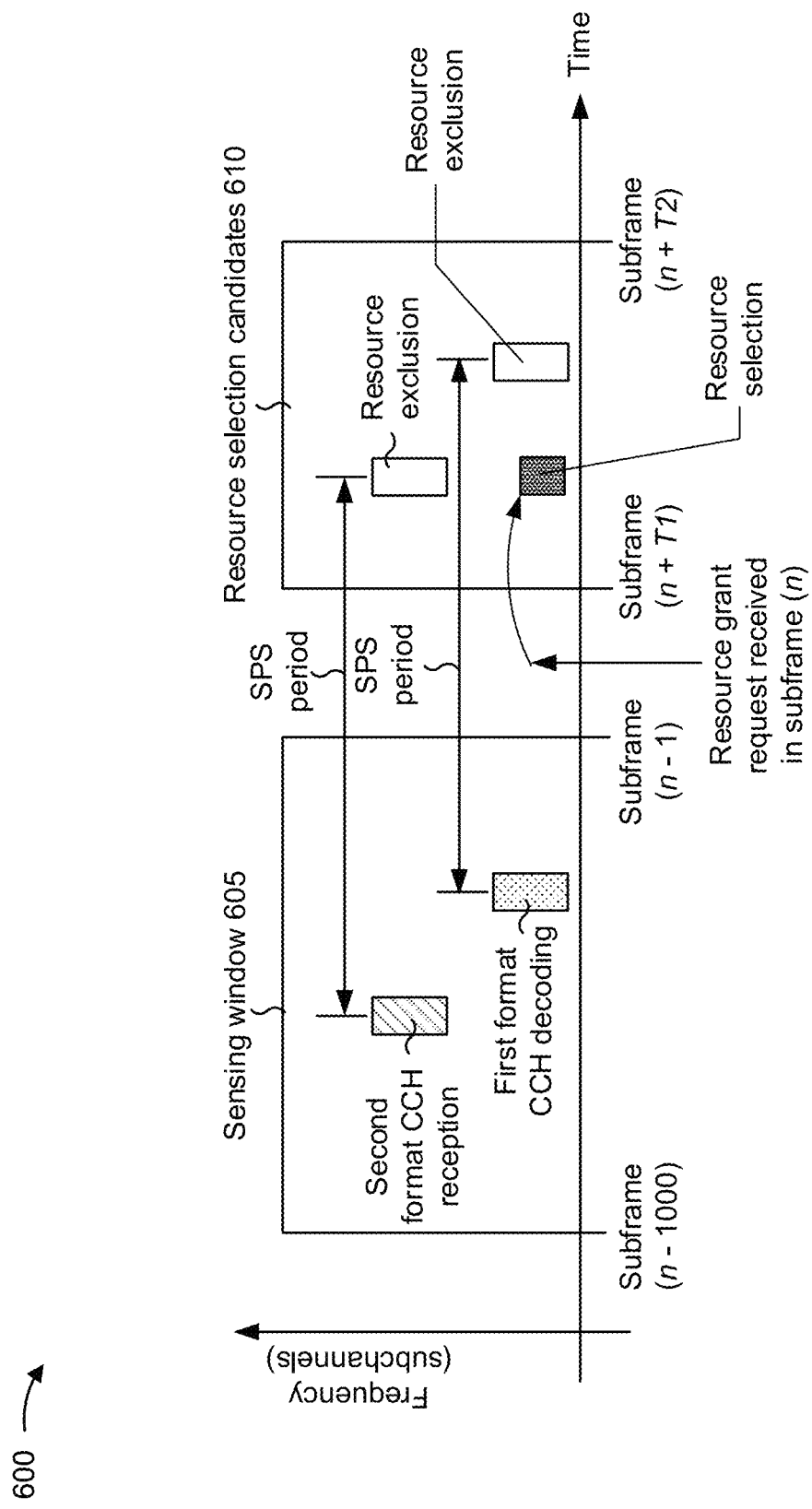
FIG. 6 is a diagram illustrating an example of avoiding resource collision for messages with different control channel formats, in accordance with the present disclosure.

FIG. 6 is a diagram illustrating an example 600 of avoiding resource collision for messages with different control channel formats, in accordance with the present disclosure. As shown in FIG. 6, a UE (e.g., UE 120, UE 305-1 and/or UE 305-2 of FIG. 3, and/or UE 405 and/or UE 410 of FIG. 4) may monitor for messages within a sensing window 605. The sensing window 605 may span a portion of a time domain (e.g., represented as subframe (n−1000) to subframe (n−1) in example 600, where n may represent a current subframe) and a portion of a frequency domain. In some aspects, the UE 120 may use RSSI sensing within the sensing window 605.

As further shown in FIG. 6, the UE 120 may select resources for transmission from resource selection candidates 610. For example, the UE 120 may select resources in response to detecting a message within the sensing window 605. Accordingly, the UE 120 may grant the selected resources to another device (such as another UE) to use for transmission (e.g., over a sidelink channel, as described above in connection with FIGS. 3-4). For example, the UE may transmit a grant at a subframe represented by n to the other device for the resources selected within the resource selection candidates 610. Similar to the sensing window 605, the resource selection candidates 610 may span a portion of the time domain (e.g., represented as subframe (n+T1) to subframe (n+T2) in example 600, where T1 may represent an offset associated with a resource request from the other device, and T2 may represent a length associated with the resource selection candidates 610 with respect to T1) and a portion of the frequency domain.

In some aspects, the UE 120 may determine the resource selection candidates 610 based at least in part on applying resource exclusion that is based at least in part on CCH information included in a message, which is detected within the sensing window 605. For example, as shown in FIG. 6, the UE 120 may use an SPS period, a priority value, an RSVP value, and/or another parameter indicated by the CCH information to exclude one or more resources from the resource selection candidates 610. The UE 120 may therefore prevent resource collision with further transmissions on the CCH and/or an SCH associated with the CCH information.

As further shown in FIG. 6, the UE 120 may support a second format for encoding CCH information. For example, the second format may be a legacy format relative to a first format. In some aspects, the first format may be defined within a first standard, and the second format may be defined within a second standard. Accordingly, in some aspects, the second standard may be a legacy standard relative to the first standard. For example, the first standard and the second standard may be defined by 3GPP specifications and/or other standards documents. For example, the first standard may be defined in a first release of 3GPP specifications (such as Release 15), and the second standard may be defined in a second release of 3GPP specifications (such as Release 14) that is a legacy release relative to the first release.

In some aspects, the first standard may support at least one modulation technique that is not supported by the second standard. For example, the first standard may support 64 QAM and/or another modulation technique, while the second standard does not. In some aspects, the first standard and the second standard may additionally support at least one modulation technique in common, such as QPSK modulation, 16 QAM, and/or another modulation technique.

As further shown in FIG. 6, the UE 120 may support the second standard but not support the first standard. Accordingly, the UE 120 may receive (e.g., during the sensing window 605) a control channel message encoded according to the first format. As described above, the second format may be a legacy format relative to the first format. Additionally, or alternatively, the control channel message may be associated with a different set of SCH parameters than the second format supported by the UE 120. For example, the different set of SCH parameters associated with the first format may include a different MCS table, a different TBS mapping rule, and/or another different parameter. The different set of SCH parameters may be such that a first set of UEs supports a set of SCH parameters and a second set of UEs supports a proper subset of the set of SCH parameters. The UE in example 600 may belong to the second set of UEs. Accordingly, the UE 120 may use the techniques described herein to decode CCH information included in a message, which is detected within the sensing window 605, when the message is encoded according to the first format.

Rather than discard the control channel message, the UE 120 may determine that the control channel message is encoded according to the first format based at least in part on comparing one or more bit values, of the control channel message, in bit positions corresponding to a set of bits defined by the second format, and one or more expected bit values defined by the first format. For example, the UE 120 may compare a transmission format bit value, of the control channel message, and an expected transmission format bit value defined by the first format. In some aspects, the transmission format bit value may be in a bit position corresponding to a reserved bit defined by the second format, and the reserved bit may be defined to be zero by the second format. For example, the UE 120 may determine that the expected transmission format bit value is set to "1" consistent with the first format and is located in one of a plurality of reserved bit positions that are expected to have bit values of "0" when encoded according to the second format.

Accordingly, and as further shown in FIG. 6, when the control channel message is encoded according to the first format, the UE 120 may select one or more resources for transmission based at least in part on information included in the control channel message. For example, the UE 120 may apply RSRP exclusion based at least in part on the information included in the control channel message. As an alternative, the information included in the control channel message may be consistent with both the first format and the second format such that, after determining that the control channel message is encoded according to the first format, the UE 120 is able to decode the information rather than discard the control channel message.

In some aspects, the information included in the control channel message may include priority information, resource reservation information, and/or other information. Therefore, as described above, the UE 120 may use an SPS period, a priority value, an RSVP value, and/or another parameter included in the information to exclude one or more resources from the resource selection candidates 610, as shown in FIG. 6.

By applying resource exclusion as described in connection with FIG. 6, the UE 120 reduces signal interference and improves reliability and/or quality of communications. For example, the UE 120 may improve the reliability and/or quality of communications with a base station (e.g., as described above in connection with FIGS. 1-2) and/or with other UEs (e.g., sidelink communications as described above in connection with FIGS. 3-4). In some aspects, the UE 120 may improve the reliability and/or quality of C-V2X communications.

As indicated above, FIG. 6 is provided as an example. Other examples may differ from what is described with respect to FIG. 6.

Figure 7:
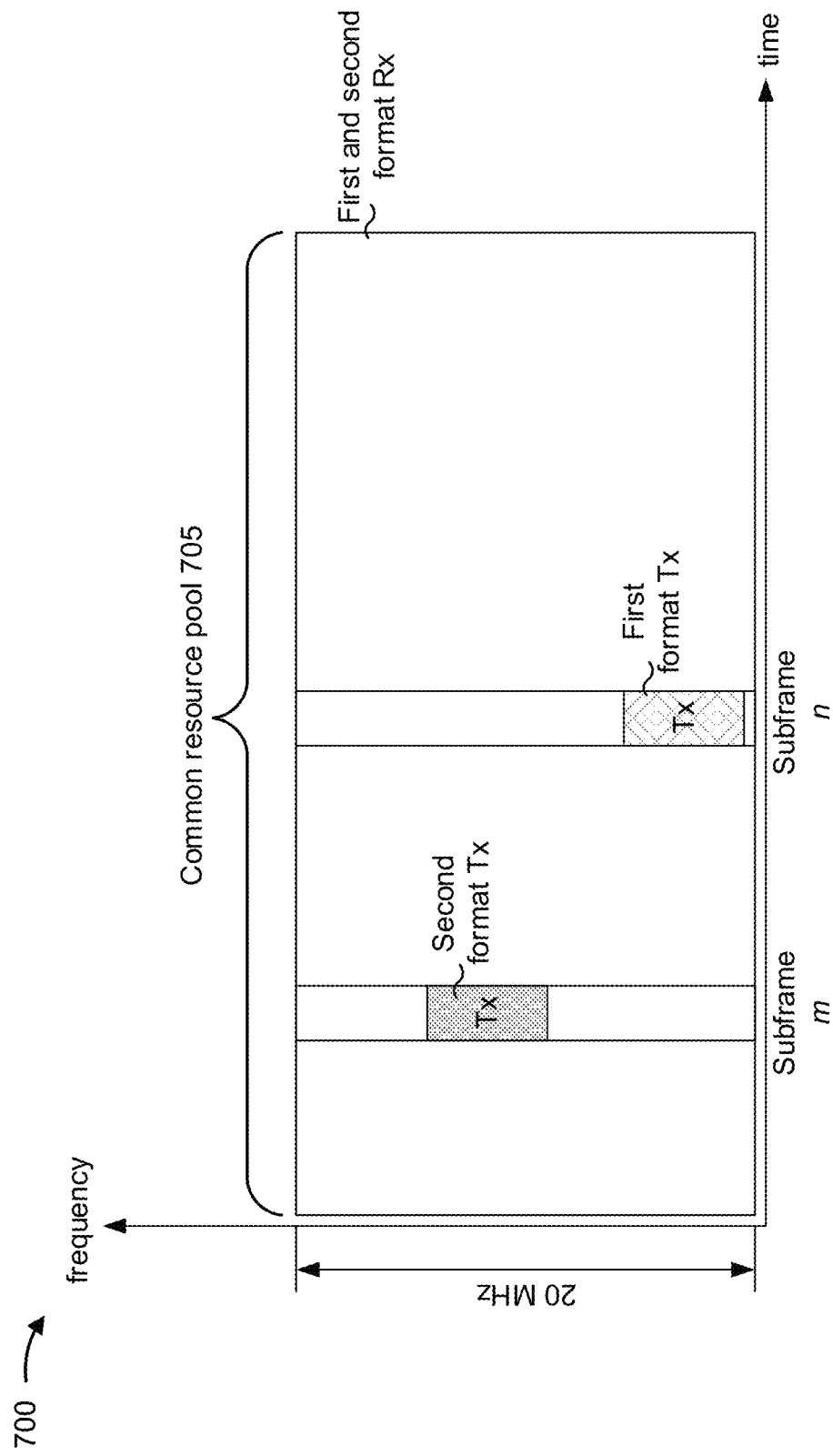
FIG. 7 is a diagram illustrating an example of a common resource pool for messages with different control channel formats, in accordance with the present disclosure.

FIG. 7 is a diagram illustrating an example 700 of a common resource pool for messages with different control channel formats, in accordance with the present disclosure. In example 700, a UE (e.g., UE 120, UE 305-1 and/or UE 305-2 of FIG. 3, and/or UE 405 and/or UE 410 of FIG. 4) may monitor a set of resources based at least in part on a resource pool configuration. As shown in FIG. 7, the resource pool configuration may indicate a common resource pool 705 (e.g., common to a first set of UEs that support a first format and a second set of UEs that support a second format, where the second format is a legacy format relative to the first format).

In some aspects, the common resource pool 705 may be configured (e.g., by a base station, such as base station 110, and/or according to 3GPP specifications and/or another standard) for a first set of UEs that support a set of SCH parameters and a second set of UEs that support a proper subset of the set of SCH parameters. For example, the set of SCH parameters may include a different MCS table, a different TBS mapping rule, and/or another different parameter, excluded from the proper subset of the set of SCH parameters.

Additionally, or alternatively, the first set of UEs may support a first standard and a second standard, and the second set of UEs may support the second standard and not support the first standard. For example, the second standard may be a legacy standard relative to the first standard. The first standard and the second standard may be defined within 3GPP specifications and/or other standards documents. For example, the first standard may be defined in a first release of 3GPP specifications (such as Release 15), and the second standard may be defined in a second release of 3GPP specifications (such as Release 14) that is a legacy release relative to the first release. Additionally, or alternatively, the first standard may support at least one modulation technique not supported by the second standard. For example, the first standard may support 64 QAM and/or another modulation technique, while the second standard does not. In some aspects, the first standard and the second standard may additionally support at least one modulation technique in common, such as QPSK modulation, 16 QAM, and/or another modulation technique.

The UE 120 may monitor the set of resources within the common resource pool 705 by applying RSSI sensing based at least in part on the resource pool configuration. Accordingly, the UE 120 may use the common resource pool 705 for reception (Rx). For example, the UE 120 may apply RSSI sensing to one or more resources within the common resource pool 705. UEs that support the first format may similarly use the common resource pool 705 for reception (Rx), as shown in FIG. 7.

As further shown in FIG. 7, the UE 120 may select one or more resources from the common resource pool 705 for transmission based at least in part on monitoring the set of resources. Accordingly, the UE 120 may use the common resource pool 705 for transmission (Tx). UEs that support the first format may similarly use the common resource pool 705 for transmission (Tx), as shown in FIG. 7.

In some aspects, the UE 120 may receive a control channel message (e.g., while monitoring the set of resources, as described above) and apply RSRP exclusion based at least in part on information included in the control channel message. Accordingly, the UE 120 may select one or more resources from the common resource pool 705 for transmission based at least in part on applying the RSRP exclusion. In example 700, the UE 120 selects resources within a subframe represented by m to use for transmission, while a UE that supports the first format selects resources within a subframe represented by n to use for transmission.

Example 700 of FIG. 7 may be combined with example 600 of FIG. 6. For example, as described above, the UE 120 may receive a control channel message when monitoring the set of resources. The control channel message may be encoded according to the first format. Accordingly, the UE 120 may select one or more resources for transmission, within the common resource pool 705 of FIG. 7, based at least in part on information included in the control channel message encoded according to the first format (e.g., as described above in connection with FIG. 6).

For example, based at least in part on receiving the control channel message, the UE 120 may determine that the control channel message is encoded according to the first format based at least in part on comparing one or more bit values, of the control channel message, in bit positions corresponding to a set of bits defined by a second format supported by the second set of UEs, and one or more expected bit values defined by the first format (e.g., as described above in connection with FIG. 6). Accordingly, when the control channel message is encoded according to the first format, the UE 120 may select one or more resources for transmission based at least in part on information included in the control channel message. For example, the UE 120 may use the information to select the one or more resources from the common resource pool 705.

By using a common resource pool as described in connection with FIG. 7, the UE 120 reduces signal interference and improves reliability and/or quality of communications. For example, the UE 120 may improve the reliability and/or quality of communications with a base station (e.g., as described above in connection with FIGS. 1-2) and/or with other UEs (e.g., sidelink communications as described above in connection with FIGS. 3-4). In some aspects, the UE 120 may improve the reliability and/or quality of C-V2X communications.

As indicated above, FIG. 7 is provided as an example. Other examples may differ from what is described with respect to FIG. 7.

Figure 8:
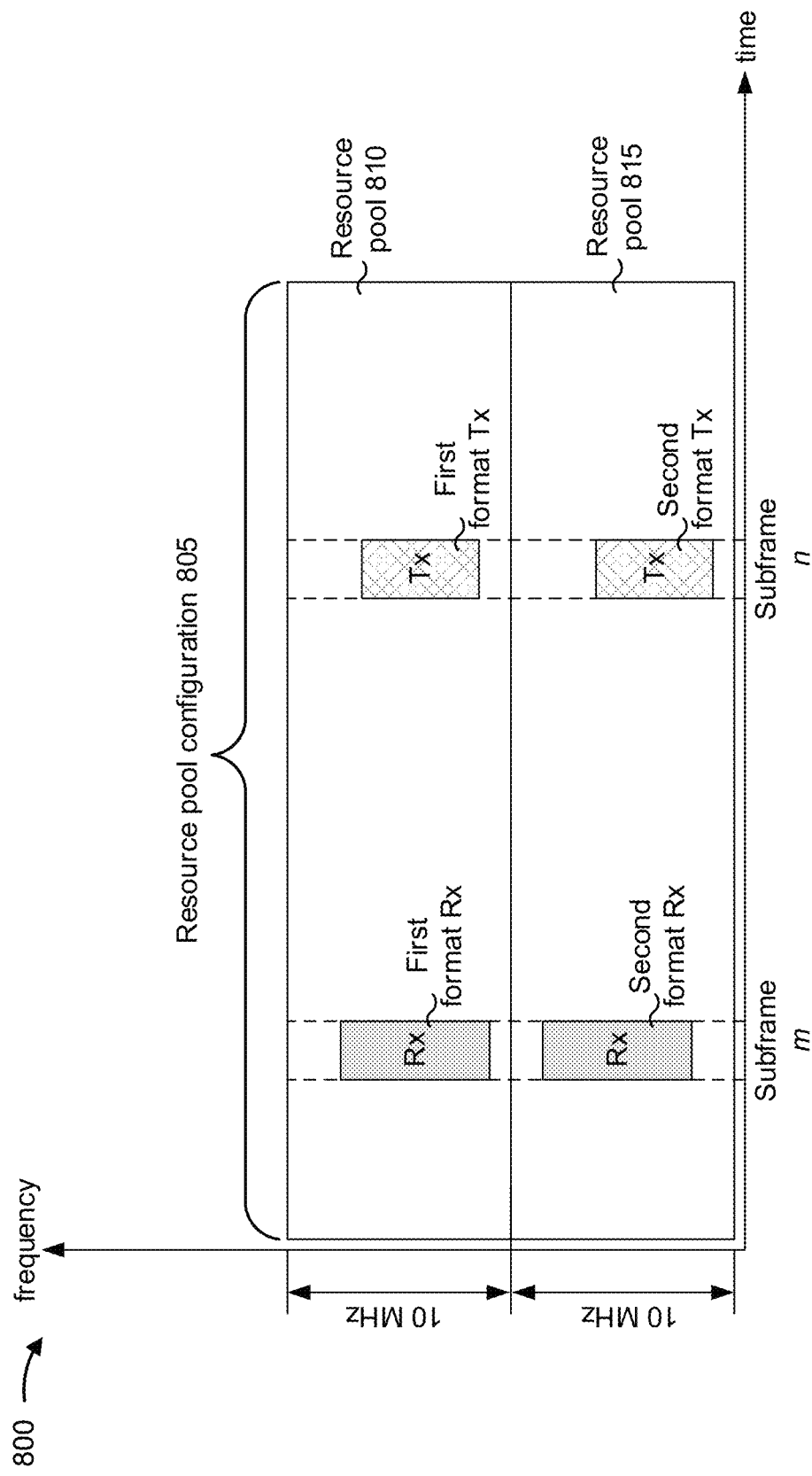
FIG. 8 is a diagram illustrating an example of resource pools divided in a frequency domain for messages with different control channel formats, in accordance with the present disclosure.

FIG. 8 is a diagram illustrating an example 800 of resource pools divided in a frequency domain for messages with different control channel formats, in accordance with the present disclosure. In example 800, a UE (e.g., UE 120, UE 305-1 and/or UE 305-2 of FIG. 3, and/or UE 405 and/or UE 410 of FIG. 4) may monitor a set of resources based at least in part on a resource pool configuration 805. As shown in FIG. 8, the resource pool configuration 805 may indicate a first resource pool 810 configured (e.g., by a base station, such as base station 110, and/or according to 3GPP specifications and/or another standard) for a first set of UEs that support a set of SCH parameters, and a second resource pool 815 configured (e.g., by the base station 110, and/or according to 3GPP specifications and/or another standard) for a second set of UEs (including the UE 120) that support a proper subset of the set of SCH parameters. For example, the set of SCH parameters may include a different MCS table, a different TBS mapping rule, and/or another different parameter, excluded from the proper subset of the set of SCH parameters.

Additionally, or alternatively, the first set of UEs may support a first standard and a second standard, and the second set of UEs may support the second standard and not support the first standard. For example, the second standard may be a legacy standard relative to the first standard. The first standard and the second standard may be defined within 3GPP specifications and/or other standards documents. For example, the first standard may be defined in a first release of 3GPP specifications (such as Release 15), and the second standard may be defined in a second release of 3GPP specifications (such as Release 14) that is a legacy release relative to the first release. Additionally, or alternatively, the first standard may support at least one modulation technique not supported by the second standard. For example, the first standard may support 64 QAM and/or another modulation technique while the second standard does not. In some aspects, the first standard and the second standard may additionally support at least one modulation technique in common, such as QPSK modulation, 16 QAM, and/or another modulation technique.

As shown in FIG. 8, the UE 120 may use the second resource pool 815 for reception (Rx) of messages encoded according to the second format. Accordingly, the UE 120 may monitor the set of resources by applying RSSI sensing based at least in part on the resource pool configuration 805. For example, the UE 120 may apply RSSI sensing to one or more resources within the second resource pool 815. In example 800, the UE 120 monitors a subframe represented by m, within the second resource pool 815, to receive messages encoded according to the second format. Similarly, UEs that support the first format may use the first resource pool 810 for reception (Rx) of messages encoded according to the first format. In example 800, a UE that supports the first format monitors the subframe represented by m, within the first resource pool 810, to receive messages encoded according to the first format. Accordingly, in some aspects, and as shown in FIG. 8, the first resource pool 810 may be separated from the second resource pool 815 in a frequency domain.

As further shown in FIG. 8, the UE 120 may select one or more resources from the second resource pool 815 for transmission based at least in part on monitoring the set of resources. Accordingly, the UE 120 may use the second resource pool 815 for transmission (Tx). By avoiding transmission in the first resource pool 810, the UE 120 may avoid interference with transmissions encoded according to the first format. UEs that support the first format may similarly use the first resource pool 810 for transmission (Tx), as shown in FIG. 8. By avoiding transmission in the second resource pool 815, a UE that supports the first format may avoid interference with transmissions encoded according to the second format.

In some aspects, the UE 120 may receive a control channel message (e.g., while monitoring the set of resources, as described above) and apply RSRP exclusion based at least in part on information included in the control channel message. Accordingly, the UE 120 may select one or more resources from the second resource pool 815 for transmission based at least in part on applying the RSRP exclusion. In example 800, the UE 120 selects resources within a subframe represented by n and within the second resource pool 815 to use for transmission, while a UE that supports the first format selects resources within the subframe represented by n and within the first resource pool 810 to use for transmission.

Example 800 of FIG. 8 may be combined with example 600 of FIG. 6. For example, as described above, the UE 120 may receive a control channel message when monitoring the set of resources. The control channel message may be encoded according to the first format. Accordingly, the UE 120 may select one or more resources, within the second resource pool 815 of FIG. 8, based at least in part on information included in the control channel message encoded according to the first format (e.g., as described above in connection with FIG. 6).

For example, based at least in part on receiving the control channel message, the UE 120 may determine that the control channel message is encoded according to the first format based at least in part on comparing one or more bit values, of the control channel message, in bit positions corresponding to a set of bits defined by a second format supported by the second set of UEs, and one or more expected bit values defined by the first format. Accordingly, when the control channel message is encoded according to the first format, the UE 120 may select one or more resources for transmission based at least in part on information included in the control channel message. For example, the UE 120 may use the information to select the one or more resources from the second resource pool 815.

By using separate resource pools as described in connection with FIG. 8, the UE 120 reduces signal interference and improves reliability and/or quality of communications. For example, the UE 120 may improve the reliability and/or quality of communications with a base station (e.g., as described above in connection with FIGS. 1-2) and/or with other UEs (e.g., sidelink communications as described above in connection with FIGS. 3-4). In some aspects, the UE 120 may improve the reliability and/or quality of C-V2X communications.

As indicated above, FIG. 8 is provided as an example. Other examples may differ from what is described with respect to FIG. 8.

Figure 9:
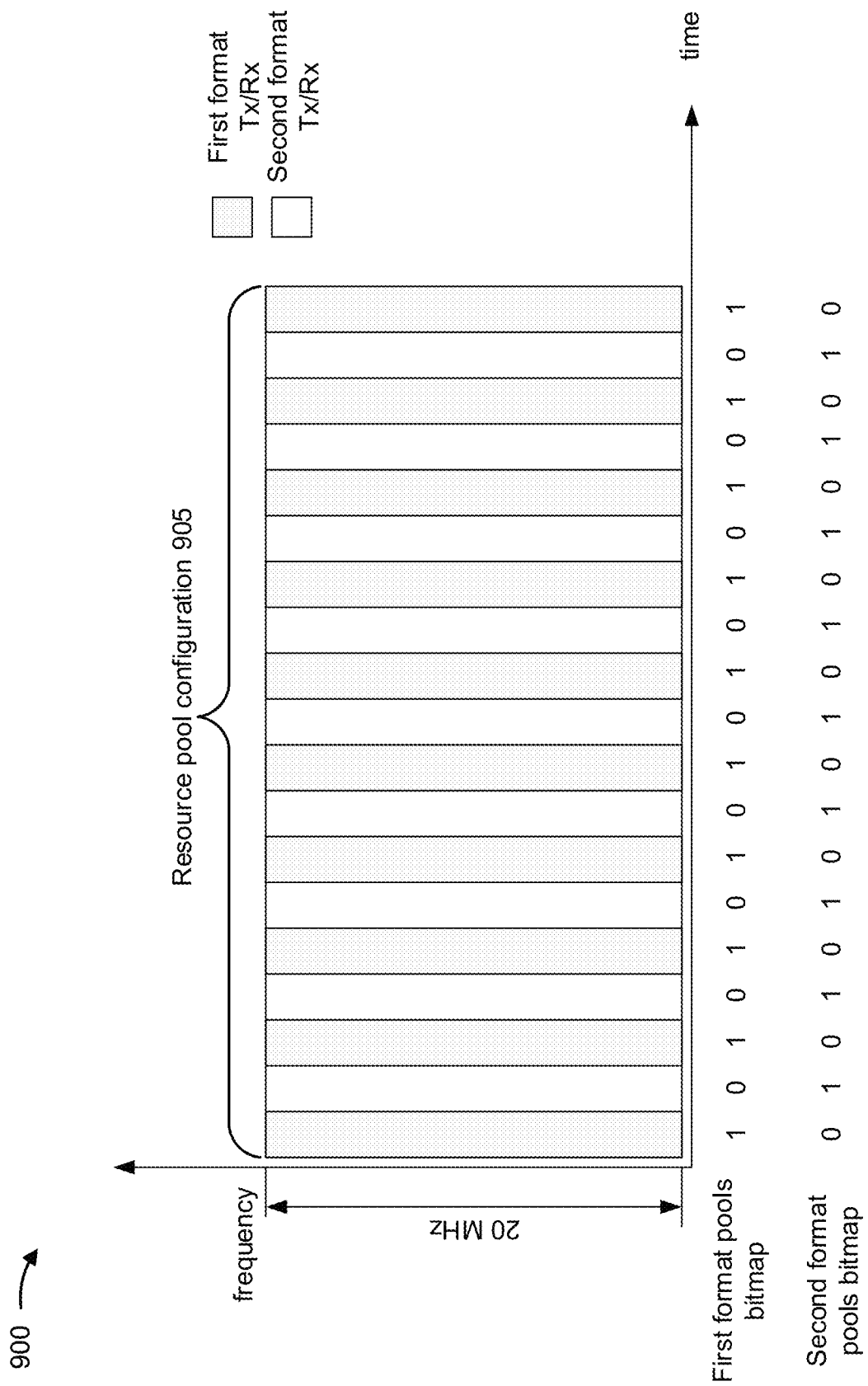
FIG. 9 is a diagram illustrating an example of resource pools divided in a time domain for messages with different control channel formats, in accordance with the present disclosure.

FIG. 9 is a diagram illustrating an example 900 of resource pools divided in a frequency domain for messages with different control channel formats, in accordance with the present disclosure. In example 900, a UE (e.g., UE 120, UE 305-1 and/or UE 305-2 of FIG. 3, and/or UE 405 and/or UE 410 of FIG. 4) may monitor a set of resources based at least in part on a resource pool configuration 905. As shown in FIG. 9, the resource pool configuration 905 may indicate resource pools associated with a first format (e.g., defined by the first format pools bitmap) for a first set of UEs that support a set of SCH parameters and resource pools associated with a second format (e.g., defined by the second format pools bitmap) for a second set of UEs (including the UE 120) that support a proper subset of the set of SCH parameters. For example, the set of SCH parameters may include a different MCS table, a different TBS mapping rule, and/or another different parameter, excluded from the proper subset of the set of SCH parameters.

Additionally, or alternatively, the first set of UEs may support a first standard and a second standard, and the second set of UEs may support the second standard and not support the first standard. For example, the second standard may be a legacy standard relative to the first standard. The first standard and the second standard may be defined within 3GPP specifications and/or other standards documents. For example, the first standard may be defined in a first release of 3GPP specifications (such as Release 15), and the second standard may be defined in a second release of 3GPP specifications (such as Release 14) that is a legacy release relative to the first release. Additionally, or alternatively, the first standard may support at least one modulation technique not supported by the second standard. For example, the first standard may support 64 QAM and/or another modulation technique while the second standard does not. In some aspects, the first standard and the second standard may additionally support at least one modulation technique in common, such as QPSK modulation, 16 QAM, and/or another modulation technique.

In some aspects, a bitmap (e.g., the first format pools bitmap and/or the second format pools bitmap) may include a quantity of bits corresponding to one or more subframes within a corresponding resource pool. For example, the bits may have a first bit value (such as "0" in example 900), indicating that the corresponding subframe(s) are not part of the corresponding resource pool, or a second bit value (such as "1" in example 900), indicating that the corresponding subframe(s) are part of the corresponding resource pool. Accordingly, as shown in FIG. 9, the resource pools associated with the first format may be separated from the resource pools associated with the second format in a time domain.

As shown in FIG. 9, the UE 120 may use the resource pools associated with the second format for reception (Rx) of messages encoded according to the second format. Accordingly, the UE 120 may monitor the set of resources by applying RSSI sensing based at least in part on the resource pool configuration 905. For example, the UE 120 may apply RSSI sensing to one or more resources within the resource pools associated with the second format. In example 900, the UE 120 monitors odd subframes (e.g., subframes 1, 3, 5, 7, 9, 11, 13, 15, 17, and so on), within the resource pools associated with the second format, to receive messages encoded according to the second format. Similarly, UEs that support the first format may use the resource pools associated with the first format for reception (Rx) of messages encoded according to the first format. In example 900, a UE that supports the first format monitors even subframes (e.g., subframes 0, 2, 4, 6, 8, 10, 12, 14, 16, 18, and so on), within the resource pools associated with the first form, to receive messages encoded according to the first format. Accordingly, in some aspects, and as shown in FIG. 9, the resource pools associated with the first format may be separated from the resource pools associated with the second format in a time domain.

As further shown in FIG. 9, the UE 120 may select one or more resources, from the resource pools associated with the second format, for transmission based at least in part on monitoring the set of resources. Accordingly, the UE 120 may use the resource pools associated with the second format for transmission (Tx). By avoiding transmission in the resource pools associated with the first format, the UE 120 may avoid interference with transmissions encoded according to the first format. UEs that support the first format may similarly use the resource pools associated with the first format for transmission (Tx), as shown in FIG. 9. By avoiding transmission in the resource pools associated with the second format, a UE that supports the first format may avoid interference with transmissions encoded according to the second format.

In some aspects, the UE 120 may receive a control channel message (e.g., while monitoring the set of resources, as described above) and apply RSRP exclusion based at least in part on information included in the control channel message. Accordingly, the UE 120 may select one or more resources, from the resource pools associated with the second format, for transmission based at least in part on applying the RSRP exclusion. In example 800, the UE 120 selects resources within odd subframes and within the resource pools associated with the second format to use for transmission, while a UE that supports the first format selects resources within the even subframes and within the resource pools associated with the first format to use for transmission.

Example 900 of FIG. 9 may be combined with example 600 of FIG. 6. For example, as described above, the UE 120 may receive a control channel message when monitoring the set of resources. The control channel message may be encoded according to the first format. Accordingly, the UE 120 may select one or more resources within resource pools associated with the second format (e.g., as depicted in FIG. 9) based at least in part on information included in the control channel message encoded according to the first format (e.g., as described above in connection with FIG. 6).

For example, based at least in part on receiving the control channel message, the UE 120 may determine that the control channel message is encoded according to the first format based at least in part on comparing one or more bit values, of the control channel message, in bit positions corresponding to a set of bits defined by a second format supported by the second set of UEs, and one or more expected bit values defined by the first format. Accordingly, when the control channel message is encoded according to the first format, the UE 120 may select one or more resources for transmission based at least in part on information included in the control channel message. For example, the UE 120 may use the information to select the one or more resources from the resource pools, associated with the second format, as depicted in FIG. 9.

By using separate resource pools as described in connection with FIG. 9, the UE 120 reduces signal interference and improves reliability and/or quality of communications. For example, the UE 120 may improve the reliability and/or quality of communications with a base station (e.g., as described above in connection with FIGS. 1-2) and/or with other UEs (e.g., sidelink communications as described above in connection with FIGS. 3-4). In some aspects, the UE 120 may improve the reliability and/or quality of C-V2X communications.

As indicated above, FIG. 9 is provided as an example. Other examples may differ from what is described with respect to FIG. 9.

Figure 10:
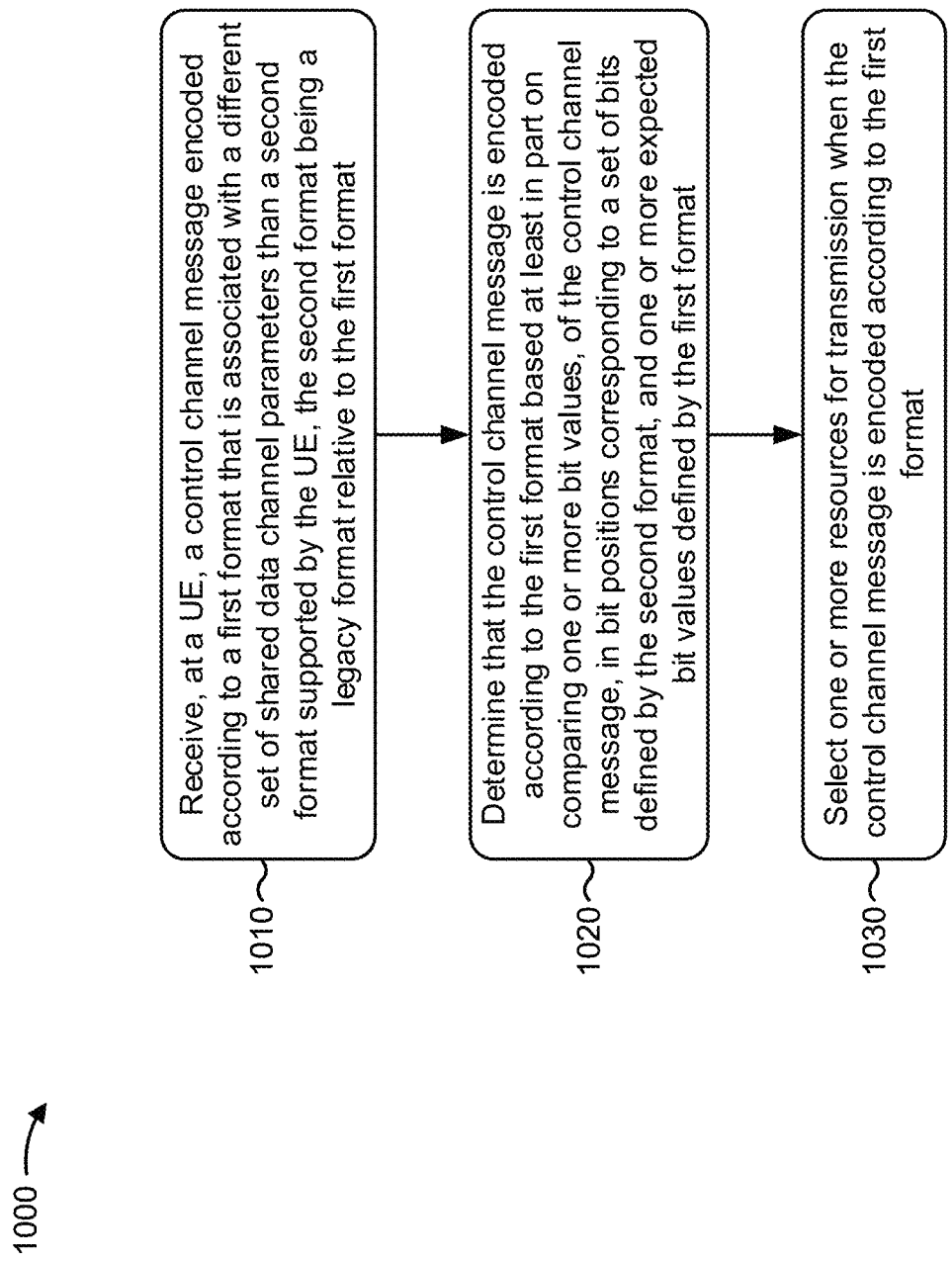
FIG. 10 is a diagram illustrating an example process performed by a UE, in accordance with the present disclosure.

FIG. 10 is a diagram illustrating an example process 1000 performed, for example, by a UE, in accordance with the present disclosure. Example process 1000 is an example where the UE (e.g., UE 120 and/or UE 305) performs operations associated with supporting legacy control channel formats.

As shown in FIG. 10, in some aspects, process 1000 may include receiving a control channel message encoded according to a first format that is associated with a different set of SCH parameters than a second format supported by the UE (block 1010). For example, the UE (e.g., using one or more of antenna 252, demodulator 254, MIMO detector 256, receive processor 258, controller/processor 280, and/or memory 282) may receive the control channel message encoded according to the first format, as described above. In some aspects, the second format is a legacy format relative to the first format.

As further shown in FIG. 10, in some aspects, process 1000 may include determining that the control channel message is encoded according to the first format based at least in part on comparing one or more bit values, of the control channel message, in bit positions corresponding to a set of bits defined by the second format, and one or more expected bit values defined by the first format (block 1020). For example, the UE (e.g., using one or more of demodulator 254, MIMO detector 256, receive processor 258, transmit processor 264, TX MIMO processor 266, controller/processor 280, and/or memory 282) may determine that the control channel message is encoded according to the first format based at least in part on comparing one or more bit values, of the control channel message, in bit positions corresponding to a set of bits defined by the second format, and one or more expected bit values defined by the first format, as described above.

As further shown in FIG. 10, in some aspects, process 1000 may include selecting one or more resources for transmission, based at least in part on information included in the control channel message (block 1030). For example, the UE (e.g., using one or more of modulator 254, transmit processor 264, TX MIMO processor 266, controller/processor 280, and/or memory 282) may select one or more resources for transmission, based at least in part on information included in the control channel message, when the control channel message is encoded according to the first format, as described above.

Process 1000 may include additional aspects, such as any single aspect or any combination of aspects described below and/or in connection with one or more other processes described elsewhere herein.

In a first aspect, the first format is defined within a first standard, and the second format is defined within a second standard, the second standard is a legacy standard relative to the first standard.

In a second aspect, alone or in combination with the first aspect, the UE supports the second standard and does not support the first standard.

In a third aspect, alone or in combination with one or more of the first and second aspects, the first standard supports at least one modulation technique that is not supported by the second standard.

In a fourth aspect, alone or in combination with one or more of the first through third aspects, the different set of SCH parameters include at least one of a different MCS table, a different TBS mapping rule, or a combination thereof.

In a fifth aspect, alone or in combination with one or more of the first through fourth aspects, the comparing includes comparing (e.g., using one or more of demodulator 254, MIMO detector 256, receive processor 258, transmit processor 264, TX MIMO processor 266, controller/processor 280, and/or memory 282) a transmission format bit value, of the control channel message, and an expected transmission format bit value defined by the first format when comparing the one or more bit values, of the control channel message, and the one or more expected bit values defined by the first format.

In a sixth aspect, alone or in combination with one or more of the first through fifth aspects, the transmission format bit value is in a bit position corresponding to a reserved bit defined by the second format, and the reserved bit is defined to be zero by the second format.

In a seventh aspect, alone or in combination with one or more of the first through sixth aspects, the information included in the control channel message includes at least one of priority information, resource reservation information, or a combination thereof.

In an eighth aspect, alone or in combination with one or more of the first through seventh aspects, selecting the one or more resources for transmission includes applying RSRP exclusion (e.g., using one or more of modulator 254, transmit processor 264, TX MIMO processor 266, controller/processor 280, and/or memory 282) based at least in part on the information included in the control channel message.

In a ninth aspect, alone or in combination with one or more of the first through eighth aspects, selecting the one or more resources for transmission is based at least in part on a resource pool configuration, the resource pool configuration indicating one of: a common resource pool for a first is setting of UEs that support the first format and a second set of UEs that support the second format, or a first resource pool for the first set of UEs and a second resource pool for the second set of UEs, the first resource pool being separate from the second resource pool.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
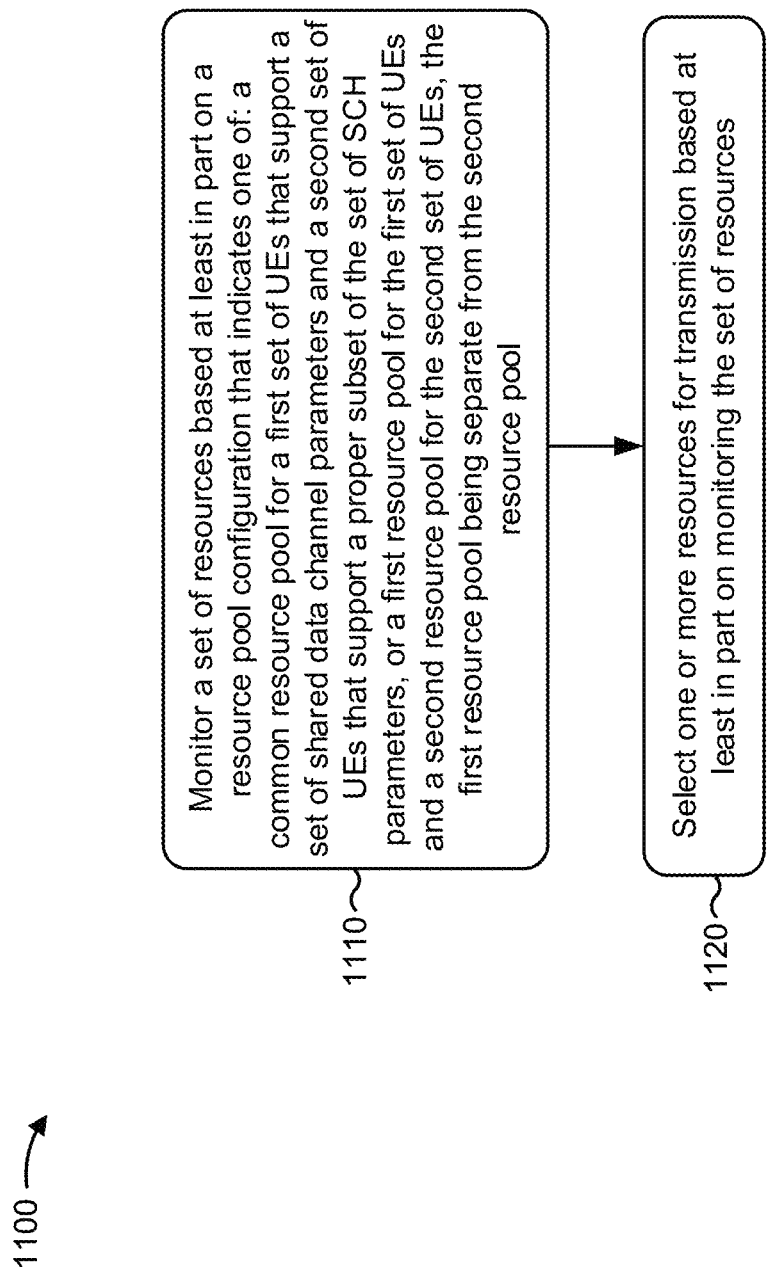
FIG. 11 is a diagram illustrating another example process performed by a UE, in accordance with the present disclosure.

FIG. 11 is a diagram illustrating an example process 1100 performed, for example, by a UE, in accordance with the present disclosure. Example process 1100 is an example where the UE (e.g., UE 120 and/or UE 305) performs operations associated with supporting legacy control channel formats.

As shown in FIG. 11, in some aspects, process 1100 may include monitoring a set of resources based at least in part on a resource pool configuration (block 1110). For example, the UE (e.g., using one or more of antenna 252, demodulator 254, MIMO detector 256, receive processor 258, controller/processor 280, and/or memory 282) may monitor the set of resources based at least in part on the resource pool configuration, as described above. In some aspects, the resource pool configuration indicates one of: a common resource pool for a first set of UEs that support a set of SCH parameters and a second set of UEs that support a proper subset of the set of SCH parameters, or a first resource pool for the first set of UEs and a second resource pool for the second set of UEs, the first resource pool being separate from the second resource pool.

As further shown in FIG. 11, in some aspects, process 1100 may include selecting one or more resources, from the common resource pool or the first resource pool and the second resource pool, for transmission based at least in part on monitoring the set of resources (block 1120). For example, the UE (e.g., using one or more of modulator 254, transmit processor 264, TX MIMO processor 266, controller/processor 280, and/or memory 282) may select the one or more resources, from the common resource pool or the first resource pool and the second resource pool, for transmission based at least in part on monitoring the set of resources, as described above.

Process 1100 may include additional aspects, such as any single aspect or any combination of aspects described below and/or in connection with one or more other processes described elsewhere herein.

In a first aspect, the first resource pool is separated from the second resource pool in a frequency domain.

In a second aspect, alone or in combination with the first aspect, the first resource pool is separated from the second resource pool in a time domain.

In a third aspect, alone or in combination with one or more of the first and second aspects, monitoring the set of resources includes applying RSSI sensing (e.g., using one or more of antenna 252, demodulator 254, MIMO detector 256, receive processor 258, controller/processor 280, and/or memory 282) based at least in part on the resource pool configuration.

In a fourth aspect, alone or in combination with one or more of the first through third aspects, process 1100 further includes receiving (e.g., using one or more of antenna 252, demodulator 254, MIMO detector 256, receive processor 258, controller/processor 280, and/or memory 282) a control channel message when monitoring the set of resources, and applying RSRP exclusion (e.g., using one or more of modulator 254, transmit processor 264, TX MIMO processor 266, controller/processor 280, and/or memory 282) based at least in part on information included in the control channel message, where selecting the one or more resources is based at least in part on applying the RSRP exclusion.

In a fifth aspect, alone or in combination with one or more of the first through fourth aspects, the set of SCH parameters include at least one of a different MCS table, a different TBS mapping rule, or a combination thereof, excluded from the proper subset of the set of SCH parameters.

In a sixth aspect, alone or in combination with one or more of the first through fifth aspects, the first set of UEs support a first standard and a second standard, and the second set of UEs support the second standard and do not support the first standard.

In a seventh aspect, alone or in combination with one or more of the first through sixth aspects, the first standard supports at least one modulation technique not supported by the second standard.

In an eighth aspect, alone or in combination with one or more of the first through seventh aspects, process 1100 further includes receiving (e.g., using one or more of antenna 252, demodulator 254, MIMO detector 256, receive processor 258, controller/processor 280, and/or memory 282) a control channel message encoded according to a first format supported by the first set of UEs, when monitoring the set of resources; and determining (e.g., using one or more of demodulator 254, MIMO detector 256, receive processor 258, transmit processor 264, TX MIMO processor 266, controller/processor 280, and/or memory 282) that the control channel message is encoded according to the first format based at least in part on comparing one or more bit values, of the control channel message, in bit positions corresponding to a set of bits defined by a second format supported by the second set of UEs, and one or more expected bit values defined by the first format, where selecting the one or more resources for transmission is based at least in part on information included in the control channel message, when the control channel message is encoded according to the first format.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The following provides an overview of some Aspects of the present disclosure:

Aspect 1: A method of wireless communication performed by a user equipment (UE), comprising: receiving a control channel message encoded according to a first format that is associated with a different set of shared data channel (SCH) parameters than a second format supported by the UE, wherein the second format is a legacy format relative to the first format; determining that the control channel message is encoded according to the first format based at least in part on comparing one or more bit values, of the control channel message, in bit positions corresponding to a set of bits defined by the second format, and one or more expected bit values defined by the first format; and selecting one or more resources for transmission, based at least in part on information included in the control channel message, when the control channel message is encoded according to the first format.

Aspect 2: The method of Aspect 1, wherein the first format is defined within a first standard, and the second format is defined within a second standard, wherein the second standard is a legacy standard relative to the first standard.

Aspect 3: The method of Aspect 2, wherein the UE supports the second standard and does not support the first standard.

Aspect 4: The method of any of Aspects 2 through 3, wherein the first standard supports at least one modulation technique that is not supported by the second standard.

Aspect 5: The method of any of Aspects 1 through 4, wherein the different set of SCH parameters include at least one of a different modulation coding scheme (MCS) table, a different transport block size (TBS) mapping rule, or a combination thereof.

Aspect 6: The method of any of Aspects 1 through 5, wherein the comparing comprises comparing a transmission format bit value, of the control channel message, and an expected transmission format bit value defined by the first format when comparing the one or more bit values, of the control channel message, and the one or more expected bit values defined by the first format.

Aspect 7: The method of Aspect 6, wherein the transmission format bit value is in a bit position corresponding to a reserved bit defined by the second format, wherein the reserved bit is defined to be zero by the second format.

Aspect 8: The method of any of Aspects 1 through 7, wherein the information included in the control channel message includes at least one of priority information, resource reservation information, or a combination thereof.

Aspect 9: The method of any of Aspects 1 through 8, wherein selecting the one or more resources for transmission comprises applying reference signal received power (RSRP) exclusion based at least in part on the information included in the control channel message.

Aspect 10: The method of any of Aspects 1 through 9, wherein selecting the one or more resources for transmission is based at least in part on a resource pool configuration, wherein the resource pool configuration indicates one of: a common resource pool for a first set of UEs that support the first format and a second set of UEs that support the second format, or a first resource pool for the first set of UEs and a second resource pool for the second set of UEs, wherein the first resource pool is separate from the second resource pool.

Aspect 11: A method of wireless communication performed by a user equipment (UE), comprising: monitoring a set of resources based at least in part on a resource pool configuration, wherein the resource pool configuration indicates one of: a common resource pool for a first set of UEs that support a set of shared data channel (SCH) parameters and a second set of UEs that support a proper subset of the set of SCH parameters, or a first resource pool for the first set of UEs and a second resource pool for the second set of UEs, wherein the first resource pool is separate from the second resource pool; and selecting one or more resources, from the common resource pool or the first resource pool and the second resource pool, for transmission based at least in part on monitoring the set of resources.

Aspect 12: The method of Aspect 11, wherein the first resource pool is separated from the second resource pool in a frequency domain.

Aspect 13: The method of any of Aspects 11 through 12, wherein the first resource pool is separated from the second resource pool in a time domain.

Aspect 14: The method of any of Aspects 11 through 13, wherein monitoring the set of resources comprises applying received signal strength indicator (RSSI) sensing based at least in part on the resource pool configuration.

Aspect 15: The method of any of Aspects 11 through 14, further comprising: receiving a control channel message when monitoring the set of resources; and applying reference signal received power (RSRP) exclusion based at least in part on information included in the control channel message, wherein selecting the one or more resources is based at least in part on applying the RSRP exclusion.

Aspect 16: The method of any of Aspects 11 through 15, wherein the set of SCH parameters include at least one of a different modulation coding scheme (MCS) table, a different transport block size (TBS) mapping rule, or a combination thereof, excluded from the proper subset of the set of SCH parameters.

Aspect 17: The method of any of Aspects 11 through 16, wherein the first set of UEs support a first standard and a second standard, and the second set of UEs support the second standard and do not support the first standard.

Aspect 18: The method of Aspect 17, wherein the first standard supports at least one modulation technique not supported by the second standard.

Aspect 19: The method of any of Aspects 11 through 18, further comprising: receiving a control channel message encoded according to a first format supported by the first set of UEs, when monitoring the set of resources; and determining that the control channel message is encoded according to the first format based at least in part on comparing one or more bit values, of the control channel message, in bit positions corresponding to a set of bits defined by a second format supported by the second set of UEs, and one or more expected bit values defined by the first format, wherein selecting the one or more resources for transmission is based at least in part on information included in the control channel message, when the control channel message is encoded according to the first format.

Aspect 20: An apparatus for wireless communication at a device, comprising a processor; memory coupled with the processor; and instructions stored in the memory and executable by the processor to cause the apparatus to perform the method of one or more Aspects of Aspects 1-10.

Aspect 21: A device for wireless communication, comprising a memory and one or more processors coupled to the memory, the memory and the one or more processors configured to perform the method of one or more Aspects of Aspects 1-10.

Aspect 22: An apparatus for wireless communication, comprising at least one means for performing the method of one or more Aspects of Aspects 1-10.

Aspect 23: A non-transitory computer-readable medium storing code for wireless communication, the code comprising instructions executable by a processor to perform the method of one or more Aspects of Aspects 1-10.

Aspect 24: A non-transitory computer-readable medium storing a set of instructions for wireless communication, the set of instructions comprising one or more instructions that, when executed by one or more processors of a device, cause the device to perform the method of one or more Aspects of Aspects 1-10.

Aspect 25: An apparatus for wireless communication at a device, comprising a processor; memory coupled with the processor; and instructions stored in the memory and executable by the processor to cause the apparatus to perform the method of one or more Aspects of Aspects 11-19.

Aspect 26: A device for wireless communication, comprising a memory and one or more processors coupled to the memory, the memory and the one or more processors configured to perform the method of one or more Aspects of Aspects 11-19.

Aspect 27: An apparatus for wireless communication, comprising at least one means for performing the method of one or more Aspects of Aspects 11-19.

Aspect 28: A non-transitory computer-readable medium storing code for wireless communication, the code comprising instructions executable by a processor to perform the method of one or more Aspects of Aspects 11-19.

Aspect 29: A non-transitory computer-readable medium storing a set of instructions for wireless communication, the set of instructions comprising one or more instructions that, when executed by one or more processors of a device, cause the device to perform the method of one or more Aspects of Aspects 11-19.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories storing processor-executable code; and
   one or more processors coupled with the one or more memories, at least one processor of the one or more processors configured to cause the UE to:
      receive a plurality of control channel messages during a sensing window that spans a first portion of a time domain, the plurality of control channel messages including:
         a first control channel message encoded according to a first format not supported by the UE and that is associated with a different set of shared data channel (SCH) parameters than a second format supported by the UE, the first control channel message including information indicating a reservation protocol value, and
         a second control channel message encoded according to the second format being a legacy format relative to the first format; and
      select, within resource selection candidates spanning a second portion of the time domain, one or more resources for transmission, according to reference signal received power (RSRP) exclusion applied in accordance with information included in the second control channel message and the reservation protocol value, the reservation protocol value used to select the one or more resources when the first control channel message is encoded according to the first format and in response to the first control channel message being detected within the sensing window.

2. The UE of claim 1, wherein the first format is defined within a first standard, and the second format is defined within a second standard, the second standard being a legacy standard relative to the first standard.

3. The UE of claim 2, wherein the first standard supports at least one modulation technique that is not supported by the second standard.

4. The UE of claim 2, wherein the second standard is defined in a legacy release relative to a release associated with the first standard.

5. The UE of claim 1, wherein the different set of SCH parameters include at least one of a different modulation coding scheme (MCS) table, a different transport block size (TBS) mapping rule, or a combination thereof.

6. The UE of claim 1, wherein the one or more processors are further configured to:
   compare a transmission format bit value, of the first control channel message, and an expected transmission format bit value defined by the first format to identify when the first control channel message is encoded according to the first format.

7. The UE of claim 6, wherein the transmission format bit value is in a bit position corresponding to a reserved bit defined by the second format, and the reserved bit is defined to be zero by the second format.

8. The UE of claim 1, wherein the information included in the second control channel message includes at least one of information indicating a priority value, information indicating a semi-persistent scheduling (SPS) period, or a combination thereof.

9. The UE of claim 1, wherein the one or more processors, to select the one or more resources for transmission, are configured to:
   apply the RSRP exclusion to select the one or more resources from a resource pool.

10. The UE of claim 1, wherein the one or more processors, to select the one or more resources for transmission, are configured to:
    select the one or more resources for transmission in accordance with a resource pool configuration, the resource pool configuration indicating one of:
       a common resource pool for a first set of UEs that support the first format and a second set of UEs that support the second format, or a first resource pool for the first set of UEs and a second resource pool for the second set of UEs, the first resource pool being separate from the second resource pool.

11. The UE of claim 1, wherein the first control channel message is detected using received signal strength indicator (RSSI) sensing.

12. A user equipment (UE) for wireless communication, comprising:
one or more memories storing processor-executable code; and
one or more processors coupled with the one or more memories, at least one processor of the one or more processors configured to cause the UE to:
apply received signal strength indicator (RSSI) sensing to monitor a set of resources according to a resource pool configuration, the resource pool configuration indicating one of:
a common resource pool for a first set of UEs that support a set of shared data channel (SCH) parameters, and for a second set of UEs that includes the UE and that supports a proper subset of the set of SCH parameters, or
a first resource pool for the first set of UEs and a second resource pool for the second set of UEs;
receive a plurality of control channel messages during a sensing window, the plurality of control channel messages including:
a first control channel message encoded according to a first format supported by the first set of UEs and not supported by the second set of UEs, the first control channel message including first information indicating a reservation protocol value, and
a second control channel message encoded according to a second format supported by the second set of UEs and including second information; and
select one or more resources, from the common resource pool or the first resource pool and the second resource pool, for transmission according to resource exclusion applied in accordance with the first information and the second information, the reservation protocol value corresponding to the first information being used to select the one or more resources in accordance with the first control channel message being encoded according to the first format and being detected within the sensing window.

13. The UE of claim 12, wherein the first resource pool is separated from the second resource pool in a frequency domain.

14. The UE of claim 12, wherein the first resource pool is separated from the second resource pool in a time domain.

15. The UE of claim 12, wherein the set of SCH parameters include at least one of a different modulation coding scheme (MCS) table, a different transport block size (TBS) mapping rule, or a combination thereof, excluded from the proper subset of the set of SCH parameters.

16. The UE of claim 12, wherein the first format is defined within a first standard that supports at least one modulation technique not supported by a second standard, the first standard not being supported by the second set of UEs.

17. The UE of claim 16, wherein the second standard is defined in a legacy release relative to a release associated with the first standard.

18. The UE of claim 12, wherein the one or more processors are further configured to:
receive the first control channel message encoded according to the first format, when monitoring the set of resources; and
compare one or more bit values, of the first control channel message, in bit positions corresponding to a set of bits defined by the second format, and one or more expected bit values defined by the first format to identify when the first control channel message is encoded according to the first format.

19. The UE of claim 12, wherein the one or more processors are further configured to:
decode the first information included in the first control channel message in response to identifying that the first control channel message is encoded according to the first format.

20. A method of wireless communication performed by a user equipment (UE), comprising:
receiving a plurality of control channel messages during a sensing window that spans a first portion of a time domain, the plurality of control channel messages including:
a first control channel message encoded according to a first format not supported by the UE and that is associated with a different set of shared data channel (SCH) parameters than a second format supported by the UE, the first control channel message including information indicating a reservation protocol value, and
a second control channel message encoded according to the second format being a legacy format relative to the first format; and
selecting, within resource selection candidates spanning a second portion of the time domain, one or more resources for transmission, according to reference signal received power (RSRP) exclusion applied in accordance with information included in the second control channel message and the reservation protocol value, the reservation protocol value used to select the one or more resources when the first control channel message is encoded according to the first format and in response to the first control channel message being detected within the sensing window.

21. The method of claim 20, further comprising:
comparing a transmission format bit value, of the first control channel message, and an expected transmission format bit value defined by the first format to identify when the first control channel is encoded according to the first format.

22. The method of claim 21, wherein the transmission format bit value is in a bit position corresponding to a reserved bit defined by the second format, the reserved bit being defined to be zero by the second format.

23. The method of claim 20, wherein the information included in the second control channel message includes at least one of information indicating a priority value, information indicating a semi-persistent scheduling (SPS) period, or a combination thereof.

24. The method of claim 20, wherein selecting the one or more resources for transmission comprises applying the RSRP exclusion to select the one or more resources from a resource pool.

25. The method of claim 20, wherein the different set of SCH parameters include at least one of a different modulation coding scheme (MCS) table, a different transport block size (TBS) mapping rule, or a combination thereof.

26. A method of wireless communication performed by a user equipment (UE), comprising:

applying received signal strength indicator (RSSI) sensing to monitor a set of resources according to a resource pool configuration, the resource pool configuration indicating one of:
- a common resource pool for a first set of UEs that support a set of shared data channel (SCH) parameters, and for a second set of UEs that includes the UE and that supports a proper subset of the set of SCH parameters, or
- a first resource pool for the first set of UEs and a second resource pool for the second set of UEs;

receiving a plurality of control channel messages during a sensing window, the plurality of control channel messages including:
- a first control channel message encoded according to a first format supported by the first set of UEs and not supported by the second set of UEs, the first control channel message including first information indicating a reservation protocol value, and
- a second control channel message encoded according to a second format supported by the second set of UEs and including second information; and selecting one or more resources, from the common resource pool or the first resource pool and the second resource pool, for transmission according to resource exclusion applied in accordance with the first information and the second information, the reservation protocol value corresponding to the first information being used to select the one or more resources in accordance with the first control channel message being encoded according to the first format and being detected within the sensing window.

27. The method of claim 26, wherein the first resource pool is separated from the second resource pool in a frequency domain.

28. The method of claim 26, wherein the first resource pool is separated from the second resource pool in a time domain.

29. The method of claim 26, wherein the set of SCH parameters include at least one of a different modulation coding scheme (MCS) table, a different transport block size (TBS) mapping rule, or a combination thereof, excluded from the proper subset of the set of SCH parameters.

30. The method of claim 26, further comprising:
decoding the first information included in the first control channel message in response to identifying that the first control channel message is encoded according to the first format.

* * * * *